(12) United States Patent
Ding et al.

(10) Patent No.: US 11,551,041 B2
(45) Date of Patent: Jan. 10, 2023

(54) METHOD AND DEVICE FOR CONDUCTING MEASUREMENTS FOR AN N-DIMENSIONAL DATA STRUCTURE

(71) Applicant: ROYAL BANK OF CANADA, Montreal (CA)

(72) Inventors: Weiguang Ding, Toronto (CA); Ruitong Huang, Toronto (CA); Luyu Wang, Toronto (CA); Yanshuai Cao, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 1107 days.

(21) Appl. No.: 16/177,010

(22) Filed: Oct. 31, 2018

(65) Prior Publication Data

US 2019/0130225 A1    May 2, 2019

Related U.S. Application Data

(60) Provisional application No. 62/579,417, filed on Oct. 31, 2017.

(51) Int. Cl.
*G06K 9/62* (2022.01)
*G06N 3/04* (2006.01)
*G06N 3/08* (2006.01)
*G06N 20/00* (2019.01)

(52) U.S. Cl.
CPC ......... *G06K 9/6276* (2013.01); *G06K 9/6215* (2013.01); *G06K 9/6223* (2013.01); *G06N 3/04* (2013.01); *G06N 3/08* (2013.01); *G06N 20/00* (2019.01)

(58) Field of Classification Search
CPC .. G06K 9/6276; G06K 9/6215; G06K 9/6223; G06N 3/04; G06N 3/08; G06N 20/00
See application file for complete search history.

(56) References Cited

U.S. PATENT DOCUMENTS

| | | | |
|---|---|---|---|
| 10,607,121 B2 * | 3/2020 | Takimoto | G06K 9/6276 |
| 2013/0088517 A1 * | 4/2013 | McKenna | G06F 16/904 |
| | | | 345/635 |
| 2015/0147728 A1 * | 5/2015 | Hochenbaum | G09B 19/0053 |
| | | | 434/350 |

\* cited by examiner

*Primary Examiner* — Duy M Dang
(74) *Attorney, Agent, or Firm* — Norton Rose Fulbright Canada LLP

(57) ABSTRACT

A method for acquiring measurements for a data structure corresponding to an array of variable includes: selecting a subset of elements from the data structure; measuring a sampled value for each of the selected subset of elements; storing each of the sampled values in a K-nearest neighbour (KNN) database and labelling the sampled value as certain; generating a predicted value data structure where each predicted element is generated as the value of its nearest neighbor based on the values stored in the KNN database; for each predicted element: retrieve the predicted element's X nearest neighbours for the sampled value in the KNN database, and when a value of the X nearest neighbours is the same as the predicted element, the predicted element is labelled as certain, otherwise the predicted element is labelled the values as uncertain; and repeating until all elements are labelled as certain.

17 Claims, 6 Drawing Sheets

METHOD AND DEVICE FOR CONDUCTING MEASUREMENTS FOR AN N-DIMENSIONAL DATA STRUCTURE

CROSS-REFERENCE TO RELATED APPLICATIONS

This application claims all benefit, including priority to U.S. Provisional Patent Application 62/579,417, filed Oct. 31, 2017, and entitled: METHOD AND DEVICE FOR CONDUCTING MEASUREMENTS FOR AN N-DIMENSIONAL DATA STRUCTURE, which is hereby incorporated by reference in its entirety.

FIELD

The present disclosure relates generally to data storage techniques and particularly to systems, methods, devices and computer-readable media for conducting data structure measurements.

BACKGROUND

Acquiring measurements for a data structure corresponding to an array of variables can be a time consuming process. When each individual measurement is costly, the whole array measurement is slow.

SUMMARY

In some instances, example embodiments described herein provide a method for acquiring measurements for an N-dimensional array.

In accordance with an aspect of the present disclosure, there is provided a method for acquiring measurements for a data structure corresponding to an array of variables. The method includes: a method for acquiring measurements for a data structure corresponding to an array of variables, the method comprising: selecting a subset of elements from the data structure; measuring a sampled value for each of the selected subset of elements; storing each of the sampled values in a K-nearest neighbour (KNN) database and labelling the sampled value as certain; generating a predicted value data structure where each predicted element is generated as the value of its nearest neighbor based on the values stored in the KNN database; for each predicted element: retrieve the predicted element's X nearest neighbours for the sampled value in the KNN database, and when a value of the X nearest neighbours is the same as the predicted element, the predicted element is labelled as certain, otherwise the predicted element is labelled the values as uncertain; and repeating the method by selecting a subset of the elements labelled as uncertain, until all elements are labelled as certain.

In accordance with another example, there is provided a computing device for acquiring measurements for a data structure corresponding to an array of variables, the computing device comprising at least one memory and at least one processor configured for: selecting a subset of elements from the data structure; measuring a sampled value for each of the selected subset of elements; storing each of the sampled values in a K-nearest neighbour (KNN) database and labelling the element associated with the sampled value as certain; generating a set of predicted values corresponding to the array of variables where each predicted element is generated as the value of its nearest neighbor based on the values stored in the KNN database; for each predicted element: retrieve the predicted element's nearest neighbours from the sampled values in the KNN database, and when a value of the nearest neighbours is the same as the predicted element, the predicted element is labelled as certain, otherwise the predicted element is labelled as uncertain; and repeating the method by selecting a subset of the elements labelled as uncertain, until all elements are labelled as certain.

In accordance with another example, there is provided a non-transitory computer-readable medium or media having stored thereon computer-readable instructions which when executed by at least one processor, configure the at least one processor for: selecting a subset of elements from the data structure; measuring a sampled value for each of the selected subset of elements; storing each of the sampled values in a K-nearest neighbour (KNN) database and labelling the element associated with the sampled value as certain; generating a set of predicted values corresponding to the array of variables where each predicted element is generated as the value of its nearest neighbor based on the values stored in the KNN database; for each predicted element: retrieve the predicted element's nearest neighbours from the sampled values in the KNN database, and when a value of the nearest neighbours is the same as the predicted element, the predicted element is labelled as certain, otherwise the predicted element is labelled as uncertain; and repeating the method by selecting a subset of the elements labelled as uncertain, until all elements are labelled as certain.

Many further features and combinations thereof concerning the present improvements will appear to those skilled in the art following a reading of the present disclosure.

DESCRIPTION OF THE FIGURES

Reference will now be made to the drawings, which show by way of example embodiments of the present disclosure.

DESCRIPTION OF EXAMPLE EMBODIMENTS

Figure 1:
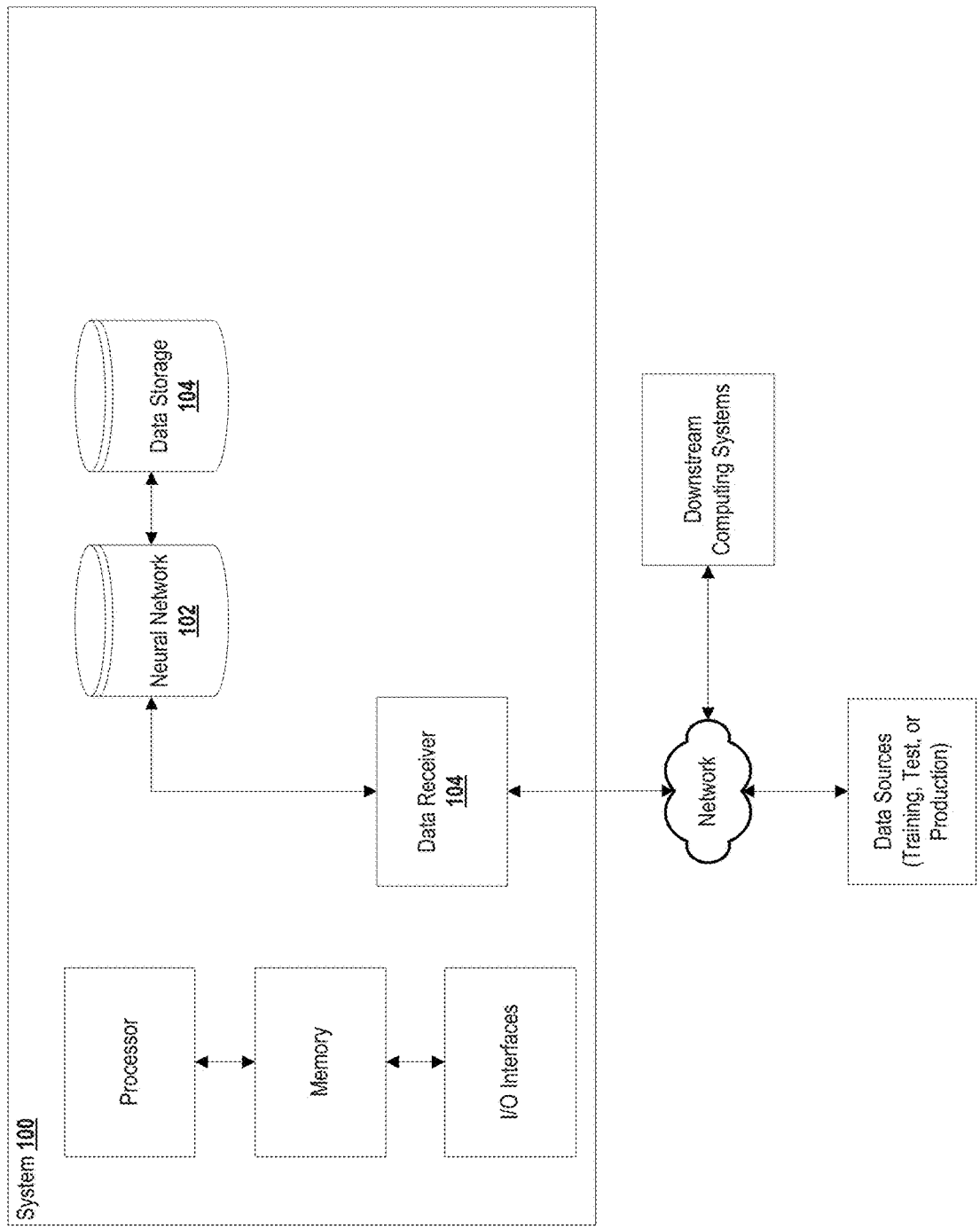
FIG. 1 is block schematic showing aspects of an example system for machine learning.

FIG. 1 is a block schematic showing aspects of an example system for machine learning. The example system 100 is implemented on one or more processors operating in conjunction with computer memory, and in some embodiments, is a computing device or a distributed set of computing devices, such as one or more computer servers. Each component described herein is provided as an illustrative non-limiting example and may be provided through the one or more processors operating with the computer memory. The computer processors include electronic circuitry. The system 100 may include one or more input and output interfaces, which may include application programming interfaces and/or hardware interface devices and displays.

A neural network 102 is maintained at data storage 104, which includes a plurality of input nodes that each map to an input feature being analyzed from a received input, and a plurality of hidden nodes used for representing various interconnections between the input nodes and one or more output nodes. The one or more output nodes can, for example, each represent a possible outcome or classification, etc.

The neural network 102 can be established to heuristically track relationships between the input nodes and the output nodes, such that weighted interconnections between the computing nodes are modified over time as more training examples are provided to the neural network 102 to tune the weights in accordance with the structure of the neural network 102. For example, in some examples, neural network 102 may established such that the hidden layer includes feed forward, backwards propagation, multiple layers, etc., which are used to modify how the neural network 102 responds to received training sets of data.

In some instances, once trained, neural network can generate classification outputs based new input data. This input data can, in some instance, involve large multidimensional arrays.

In some instances, generating classification outputs for such large arrays can be time consuming. This may be especially true when classifying large sets of data.

Designing and training neural networks can sometimes involve developing or training with different input data sets to determine how sensitive the neural network is to different parameters. In some instances, parameters are changed and outputs for the input data sets must be reclassified to compare performance. In some embodiments, results can be visualized by generating images based on the outputs.

Designing and training can also involve the consideration of adversarial attacks which involve input sets designed to trick the neural network into providing an incorrect classification. In some instances, parameters for these inputs can be varied and the neural network's outputs can be compared. To compare results, inputs are generated using different parameters and then have to be classified by the neural network to determine performance.

In some embodiments, aspects of the present disclosure may reduce the number of measurements required to populate or otherwise obtain values for every element in a data structure array.

In some embodiments, method(s) described herein method do not involve measuring each element of the array. Instead, in some instances, they employ a smart sampling strategy to sample a subset of the array, and use this sampled subset to reconstruct the entire array.

In some embodiments, the array elements can represent classification results. For example, each pixel or array element can represent the classification result of a vector. In a 2D map scenario, the vector can, for example, be a linear combination of two vectors:

$$vec = \alpha * vec0 + \beta * vec1$$

where $\alpha$ and $\beta$ are the pixel coordinates in the 2D map.

In some instances, each element of the array can be a categorical variable, whose value can only be drawn from a finite range of integers. For example, if each element represent the prediction of a 10-class image classification problem, it can take a value between integer 0 to 9.

In another example, if the input is a satellite image, the elements can represent whether a given pixel belongs to a building or a road.

In some instances, the methods and devices described herein can infer the label of data structure elements without actually running a potentially costly (time and processing power) computer calculation/process. In some instances, the methods and devices perform the computation for a subset of the elements in the data structure, and infer values for other elements with a faster and/or less computationally intensive inference computation.

Figure 2:
FIG. 2 shows an example 2-dimensional map providing a visual representation of a 2-dimensional data structure whose elements are categorical variables.

FIG. 2 shows an example 2D array to illustrate aspects of an examples method. While a 2D dimensional array is described and can be more readily illustrated, aspects of the processes and devices described herein may apply to data structures having a number of dimensions.

FIG. 2 represents a 2D array whose elements are categorical variables. Here, the color of each pixel represents its integer value. The shape of this 2D array is 128 by 128, which means it contain 16384 pixels. Naively, to acquire this 2D map, measurements must be taken for each of these 16384 pixels to get the values.

In some instances, the example method described herein may acquire the entire 2D map only sampling a subset of all the pixels.

Figure 3:
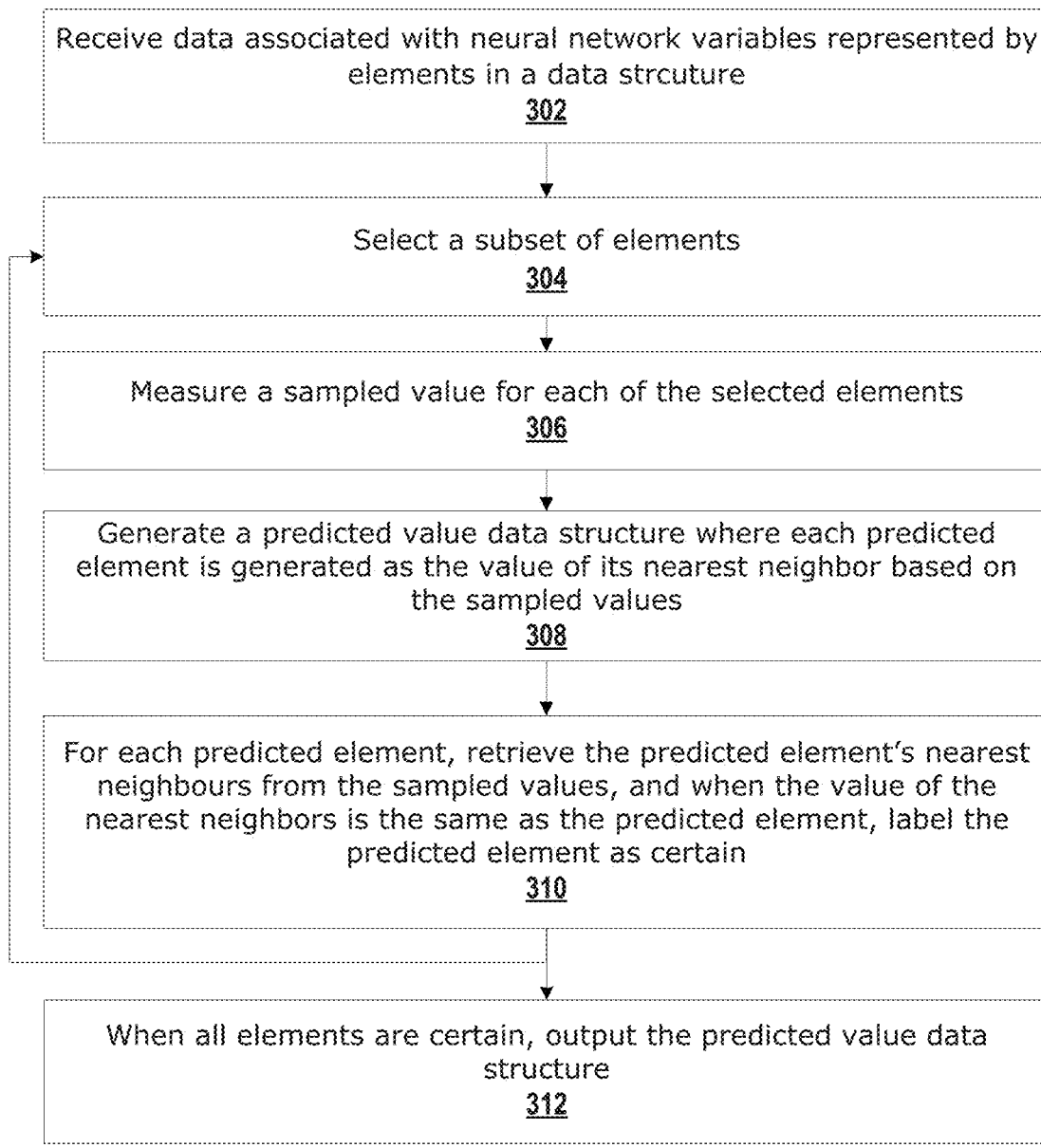
FIG. 3 shows aspects of an example process for acquiring measurements for a data structure.

FIG. 3 shows aspects of an example method for acquiring measurements for a data structure corresponding to an array of data elements. In some embodiments, the array of data elements can be representative of neural network variables.

At 302, the processor(s) receives or otherwise has access to data associated with the neural network variables which are represented by elements in the data structure.

At 304, the processor(s) select a subset of data elements in the array from the data elements which are labelled as uncertain. Initially, all data elements in the array are labelled as uncertain.

At 306, the processor(s) measure a sampled value for each of the selected subset of elements. In some embodiments, measuring a sampled value includes providing input data associated with the element to a neural network to generate an output and using the output as the sampled value.

In some embodiments, each sampled value is stored in a K-nearest neighbour (KNN) database and the element and/or sampled value is labelled as certain.

At 308, the processor(s) generate a set of predicted values corresponding to the array of variables where each predicted element is generated as the value of its nearest neighour based on the values in the KNN database (in some embodiments, these are the sampled values).

At 310, for each predicted element, the processor(s) retrieve the predicted element's nearest neighbours from the sampled values in the KNN database. In some embodiments, the processor(s) retrieve 1, 2, 3, 4, or 5 nearest neighbours. Any suitable number of neighbours can be used. In some embodiments, 5 neighbours has been found be an effective based on the resulting speed and/or accuracy.

When the value of the retrieved nearest neighbours matches the predicted element, the corresponding element is labelled as certain. Otherwise, the predicted element is labelled (in some instance, this means the label is left as uncertain).

This process is repeated with the processor(s) selecting a new subset of elements to measure from the elements labelled as uncertain.

Once the entire array is labelled as certain, the processor(s) output the predicted value data structure.

In some embodiments, outputting the predicted value data structure includes storing the predicted value data structure.

In some embodiments, outputting the predicted value data structure includes generating an image based on the values of the predicted value data structure. In some embodiments, each value represents a different classification output. In some embodiments, each different value can be represented as a different colour in the image.

In some embodiments, the image is outputted to a display, printer, communication message or other output mechanism.

In some embodiments, the image is outputted alongside or otherwise in conjunction with other images to compare neural network parameter performance.

Figure 4:
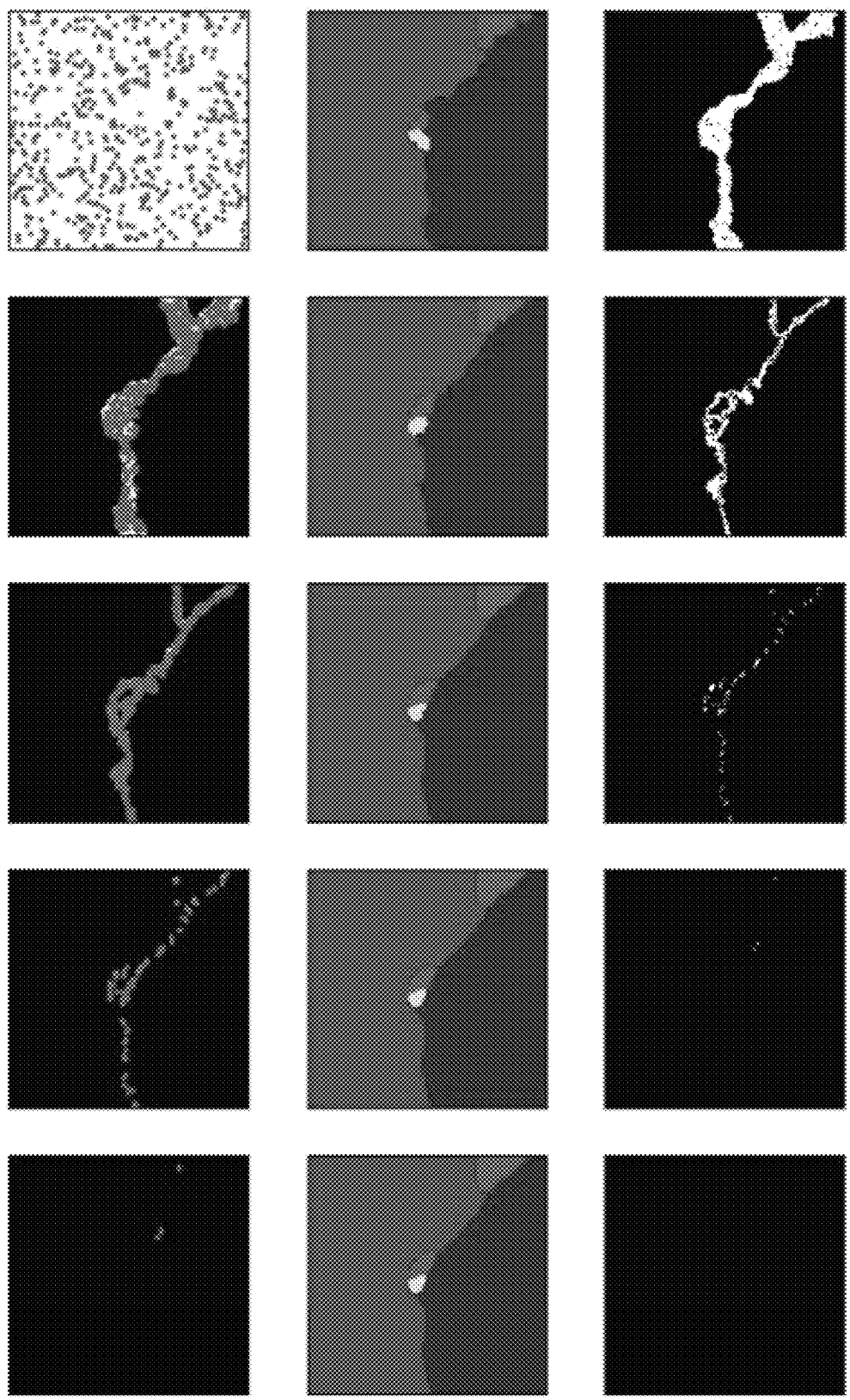
FIG. 4 shows a sequence of example 2-dimensional maps providing visual representations of 2-dimensional data structures. The left column of maps represent binary uncertainty values for each data structure element. The middle column of maps represent predicted data structure values based on KNN predictions. The right column of maps represent new binary uncertainty values for each data structure element after sampling.

FIG. 4 shows a sequence of sampling maps to illustrate the an example method. Each row of maps in FIG. 4 represents one iteration. In each row, the left image represent binary uncertainty of values in each pixel. White represents uncertain values, and black represent certain values. Blue dots in the left images, are samples of drawn from uncertain regions. The actual value on these samples are measured.

In some embodiments, the elements to be sampled are selected from uncertain elements. In some embodiments, the elements to be sampled are selected randomly. In some embodiments, each element has an equal probability to be selected.

These sampled values are stored in a K-nearest neighbor (KNN) database. The pixel coordinates are the features for retrieval, the measured categorical value are values for retrieval.

The middle image in each row is a predicted map based on KNN predictions. Specifically, the value on each pixel is predicted as the value of its nearest neighbor, based on those samples that are stored in the KNN database.

The right image represent the new binary uncertainty map after sampling. Again, white represents uncertain elements and black represents certain elements.

In some embodiments, the uncertainty value is generated by one or more processors. For each pixel/element, the processor(s) retrieve its X nearest neighbors in the KNN database. In some embodiments X is 5.

If their values are the same, then the processors label the element as certain. For pixels that are previously measured are treated as certain.

This process is repeated until there are no uncertain points in the map. After each iteration, the processors use the new uncertainty map to sample pixels and measure their values.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized.

As can be understood, the examples described above and illustrated are intended to be exemplary only.

Figure 5:
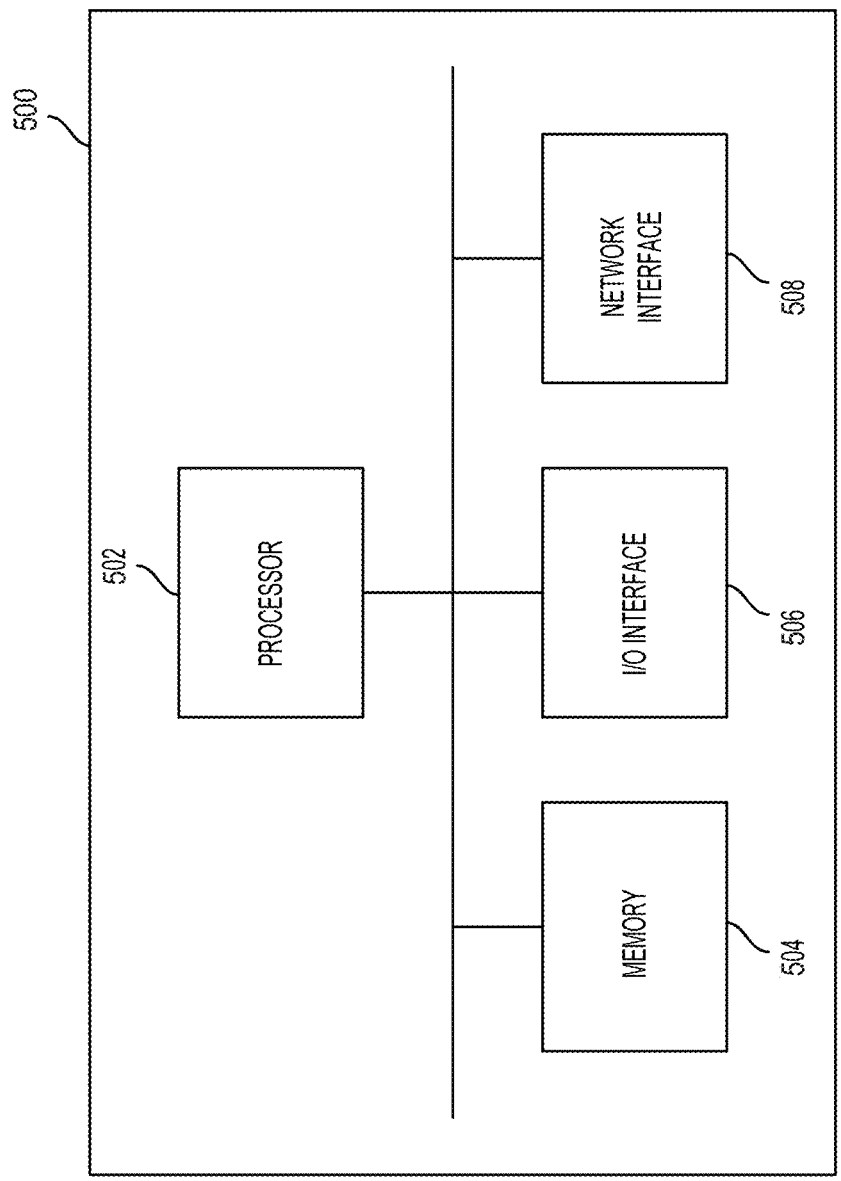
FIG. 5 shows a schematic diagram showing example devices in accordance with various aspects of the disclosure.

FIG. 5 is a schematic diagram of computing device 500, exemplary of an embodiment. As depicted, computing device 500 includes at least one processor 502, memory 504, at least one I/O interface 506, and at least one network interface 308.

Each processor 502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 6:
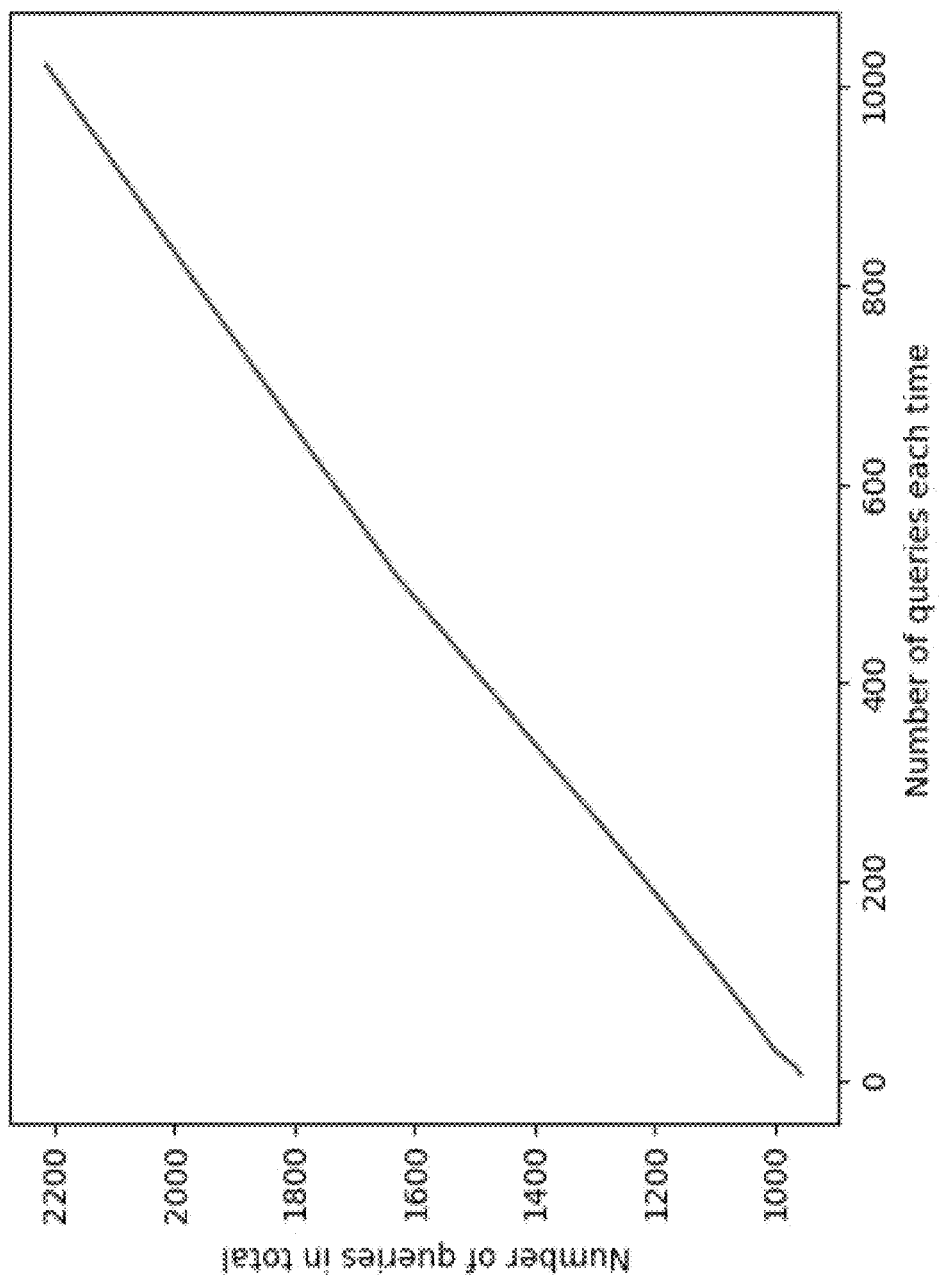
FIG. 6 shows a graph showing how the total number of samples varies as the number of samples in a single iteration is varied.

In some embodiments, the number of selected elements to sample can vary. FIG. 6 shows how the number selected elements affects the number of total queries done until the entire array is labelled as certain based on the illustrative example in FIGS. 2 and 4. In this basic example with clear delineations between classification outputs, the error was always 0. Therefore, selecting a small number of queries for each iteration would be most beneficial to reduce the total number of queries to maximize speed without sacrificing accuracy.

However, these results will vary greatly depending on the data set. For example, an array which is random noise will likely require a large number of uncertainties and will require a large almost elements to be sampled.

Notwithstanding this, selecting a reasonable number of elements to sample per iteration can result in significant decrease in time required. In some embodiments, the number of element to be sampled is k, where k is the size of a dimension of the array.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A method for acquiring measurements for a data structure corresponding to an array of variables, the method comprising:
   selecting a subset of elements from the data structure;
   measuring a sampled value for each of the selected subset of elements;
   storing each of the sampled values in a K-nearest neighbour (KNN) database and labelling the element associated with the sampled value as certain;
   generating a set of predicted values corresponding to the array of variables where each predicted element is generated as the value of the predicted element's nearest neighbor based on the values stored in the KNN database;
   for each predicted element:
      retrieve the predicted element's nearest neighbours from the sampled values in the KNN database, and when a value of the nearest neighbours is the same as the predicted element, the predicted element is labelled as certain, otherwise the predicted element is labelled as uncertain; and
   repeating the method by selecting a subset of the elements labelled as uncertain, until all elements are labelled as certain.

2. The method of claim 1 wherein previously sampled values are considered certain.

3. The method of claim 1, wherein each element is a categorical variable.

4. The method of claim 1, comprising retrieving the predicted element's X nearest neighbours, and labelling the predicted element as certain when the value of the X nearest neighbours is the same as the predicted element; where X is a positive integer.

5. The method of claim 4, where X is 5.

6. The method of claim 4, where X is k, where k is a dimension of the array.

7. The method of claim 1, comprising: outputting the set of predicted values.

8. The method of claim 1, wherein measuring a particular sampled value: providing input data corresponding to the variables associated with the particular sampled value to a neural network to generate a neural network output.

9. A computing device for acquiring measurements for a data structure corresponding to an array of variables, the computing device comprising at least one memory and at least one processor configured for:
   selecting a subset of elements from the data structure;
   measuring a sampled value for each of the selected subset of elements;
   storing each of the sampled values in a K-nearest neighbour (KNN) database and labelling the element associated with the sampled value as certain;
   generating a set of predicted values corresponding to the array of variables where each predicted element is generated as the value of the predicted element's nearest neighbor based on the values stored in the KNN database;
   for each predicted element:
      retrieve the predicted element's nearest neighbours from the sampled values in the KNN database, and when a value of the nearest neighbours is the same as the predicted element, the predicted element is labelled as certain, otherwise the predicted element is labelled as uncertain; and
   repeating the method by selecting a subset of the elements labelled as uncertain, until all elements are labelled as certain.

10. The computing device of claim 9 wherein previously sampled values are considered certain.

11. The computing device of claim 9, wherein each element is a categorical variable.

12. The computing device of claim 9, wherein the at least one processor is configured for retrieving the predicted element's X nearest neighbours, and labelling the predicted element as certain when the value of the X nearest neighbours is the same as the predicted element; where X is a positive integer.

13. The computing device of claim 12, where X is 5.

14. The computing device of claim 12, where X is k, where k is a dimension of the array.

15. The computing device of claim 9, wherein the at least one processor is configured for outputting the set of predicted values.

16. The computing device of claim 9, wherein measuring a particular sampled value: providing input data corresponding to the variables associated with the particular sampled value to a neural network to generate a neural network output.

17. A non-transitory computer-readable medium or media having stored thereon computer-readable instructions which when executed by at least one processor, configure the at least one processor for:

selecting a subset of elements from the data structure;

measuring a sampled value for each of the selected subset of elements;

storing each of the sampled values in a K-nearest neighbour (KNN) database and labelling the element associated with the sampled value as certain;

generating a set of predicted values corresponding to the array of variables where each predicted element is generated as the value of the predicted element's nearest neighbor based on the values stored in the KNN database;

for each predicted element:

retrieve the predicted element's nearest neighbours from the sampled values in the KNN database, and when a value of the nearest neighbours is the same as the predicted element, the predicted element is labelled as certain, otherwise the predicted element is labelled as uncertain; and repeating the method by selecting a subset of the elements labelled as uncertain, until all elements are labelled as certain.

\* \* \* \* \*